US008210202B2

(12) United States Patent  (10) Patent No.: US 8,210,202 B2
Verdecchia  (45) Date of Patent: *Jul. 3, 2012

(54) FLUSH VALVE DIAPHRAGM

(75) Inventor: William A. Verdecchia, Erie, PA (US)

(73) Assignee: Zurn Industries, LLC, Erie, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/365,220

(22) Filed: Feb. 4, 2009

(65) Prior Publication Data

US 2009/0139586 A1   Jun. 4, 2009

Related U.S. Application Data

(63) Continuation of application No. 11/188,960, filed on Jul. 25, 2005, now Pat. No. 7,516,754, which is a continuation of application No. 10/085,422, filed on Feb. 28, 2002, now Pat. No. 6,923,425.

(60) Provisional application No. 60/272,025, filed on Feb. 28, 2001.

(51) Int. Cl.
*F16K 31/145* (2006.01)

(52) U.S. Cl. .......................................... 137/550; 251/40
(58) Field of Classification Search .................. 137/550, 137/544; 251/40
See application file for complete search history.

(56) References Cited

U.S. PATENT DOCUMENTS

| 3,279,742 | A | 10/1966 | Billeter |
| 3,904,168 | A | 9/1975 | Marocco |
| 4,261,545 | A | 4/1981 | Allen |
| 4,327,891 | A | 5/1982 | Allen et al. |
| 4,387,878 | A | 6/1983 | Zukausky |
| 4,534,537 | A | 8/1985 | Zukausky |
| 4,817,913 | A | 4/1989 | Whiteside |
| 5,213,305 | A | 5/1993 | Whiteside et al. |
| 5,232,194 | A | 8/1993 | Saadi et al. |
| 5,295,655 | A | 3/1994 | Wilson et al. |
| 5,332,192 | A | 7/1994 | Whiteside |
| 5,335,694 | A | 8/1994 | Whiteside |
| 5,363,873 | A | 11/1994 | Richmond |
| 5,456,279 | A | 10/1995 | Parsons et al. |
| 5,476,244 | A | 12/1995 | Carroll et al. |
| 5,490,659 | A | 2/1996 | Whiteside |
| 5,649,686 | A | 7/1997 | Wilson |
| 5,755,253 | A | 5/1998 | Gronwick |
| 5,865,420 | A | 2/1999 | Wilson |
| 5,881,993 | A | 3/1999 | Wilson et al. |
| 5,887,848 | A | 3/1999 | Wilson |
| 5,967,182 | A | 10/1999 | Wilson |
| 6,182,689 | B1 | 2/2001 | Lauer et al. |
| 6,216,730 | B1 | 4/2001 | Hall |

(Continued)

FOREIGN PATENT DOCUMENTS

GB   286831   3/1928

(Continued)

*Primary Examiner* — Kevin Lee
*Assistant Examiner* — Macade Brown
(74) *Attorney, Agent, or Firm* — The Webb Law Firm

(57) ABSTRACT

A flush valve diaphragm that includes a body portion and a peripheral sealing portion. The body portion is flexible and has a central passageway. The peripheral portion includes an integral filter, an exit chamber, and a bypass arrangement, such that water flowing through the filter flows through the bypass arrangement. The integral filter prevents clogging of the bypass arrangement. The diaphragm is used in a flush valve diaphragm assembly and a flush valve.

25 Claims, 4 Drawing Sheets

U.S. PATENT DOCUMENTS

| | | |
|---|---|---|
| 6,260,576 B1 | 7/2001 | Allen |
| 6,299,128 B1 | 10/2001 | Verdecchia |
| 6,382,586 B1 | 5/2002 | Wilson et al. |
| 6,408,873 B1 | 6/2002 | Hall et al. |
| D470,920 S | 2/2003 | Verdecchia et al. |
| 6,547,212 B2 | 4/2003 | Verdecchia |
| 6,923,425 B2 * | 8/2005 | Verdecchia .................. 251/40 |
| 7,922,147 B2 * | 4/2011 | O'Connor et al. ............ 251/40 |
| 2001/0028048 A1 | 10/2001 | Verdecchia |

FOREIGN PATENT DOCUMENTS

| | | |
|---|---|---|
| GB | 1410753 | 10/1975 |
| JP | 45-41190 | 12/1970 |
| JP | 59-49381 | 12/1984 |
| JP | 61-49456 | 10/1986 |
| JP | 07012247 | 1/1995 |
| JP | 2548598 | 10/1996 |

* cited by examiner

FLUSH VALVE DIAPHRAGM

CROSS-REFERENCE TO RELATED APPLICATIONS

This application is a continuation of U.S. patent application Ser. No. 11/188,960, filed on Jul. 25, 2005, which is a continuation of U.S. patent application Ser. No. 10/085,422, filed Feb. 28, 2002, now U.S. Pat. No. 6,923,425, which claims the benefit of U.S. Provisional Patent Application No. 60/272,025 filed Feb. 28, 2001, all of which are hereby incorporated by reference in their entireties.

BACKGROUND OF THE INVENTION

1. Field of the Invention

The present invention relates to flush valves, and more particularly, to diaphragms used in flush valves.

2. Description of the Prior Art

Flush valves in water closets, urinals, and other plumbing devices which utilize a flexible diaphragm to establish and to seal off the connection between the inlet and outlet are well-known in the art. Typically, the diaphragm is made of an elastomeric material, such as rubber, and includes a bypass, which provides fluid communication between the inlet side of the flush valve and an upper chamber of the flush valve. A typical prior art diaphragm is shown in FIG. 1 of U.S. Pat. No. 5,232,194 to Saadi et al. (hereinafter "the Saadi patent") and is incorporated herein by reference.

The performance of prior art diaphragms varies depending on the pressure drop between the opposite sides of the diaphragm due to the bypass orifice. Specifically, a higher pressure difference across the diaphragm, such as will occur on a bottom floor of a multistory building, causes more water to pass through the flush valve for a fixed period of time when the flush valve is activated. Likewise, in a situation where there is a low pressure difference across the diaphragm, less water will flow through the flush valve when it is activated. Hence, the amount of water flowing through the flush valve is a function of the supply of water pressure to the flush valve.

It is shown then that diaphragm-type flush valves used in toilet devices, such as urinals and water closets, are conventionally used bypass orifices. Recently, there has been some interest in filtering the water passing through the bypass orifice to prevent clogging of the bypass orifice. Essentially, the bypass orifice diameter corresponds to the time of the flush valve refill cycle. Copending published United States Patent Application Serial No. 20010028048 A1 to Verdecchia (hereinafter the "Verdecchia application") discloses a bypass orifice for preventing the clogging of the bypass orifice and is hereby incorporated by reference. Essentially, the diameter of the bypass orifice changes during operation so that any debris clogging the bypass orifice is dislodged. More interest has been directed recently to filtering the water prior to entering the bypass orifice. This has been accomplished by providing a separate filter, which is affixed to or coacts with the diaphragm. Hence, there is a possibility of loss of the filter breaking or separating from the diaphragm. Further, a separate filter increases the number of parts required to manufacture a flush valve diaphragm assembly and increases the assembly cost of the flush valve diaphragm assembly.

Therefore, there is a need for a filter for a flush valve diaphragm that is less costly to manufacture than those known in the art.

SUMMARY OF THE INVENTION

The present invention is directed to a flush valve diaphragm that includes a body portion and a peripheral sealing portion. The body portion is flexible and has a central passageway. The peripheral portion includes an integral filter, an exit chamber, and a bypass arrangement, such that water flowing through the integral filter flows through the bypass arrangement.

The present invention is also directed to a flush valve diaphragm assembly. The present assembly includes a flush valve diaphragm and a barrel slide. The flush valve diaphragm is the present flush valve diaphragm including a central passageway. The barrel slide is partially passed through the central passageway and is secured to the diaphragm.

The present invention is further directed to a flush valve. The present flush valve includes a valve body, a valve seat, a flush valve diaphragm assembly, and a pressure chamber. The valve body defines an inlet connection and an outlet connection. The valve seat is positioned between the inlet and the outlet of the flush valve. The flush valve diaphragm assembly is movable to a closing position on the valve seat, such that it is able to stop flow between the inlet and the outlet. The diaphragm assembly is the present diaphragm assembly. The pressure chamber is defined above the diaphragm of the diaphragm assembly and acts to hold the flush valve diaphragm assembly on the valve seat.

These and other advantages of the present invention will be clarified in the description of the preferred embodiment taken together with the attached drawings in which like reference numerals represent like elements throughout.

DETAILED DESCRIPTION OF THE PREFERRED EMBODIMENTS

Figure 1:
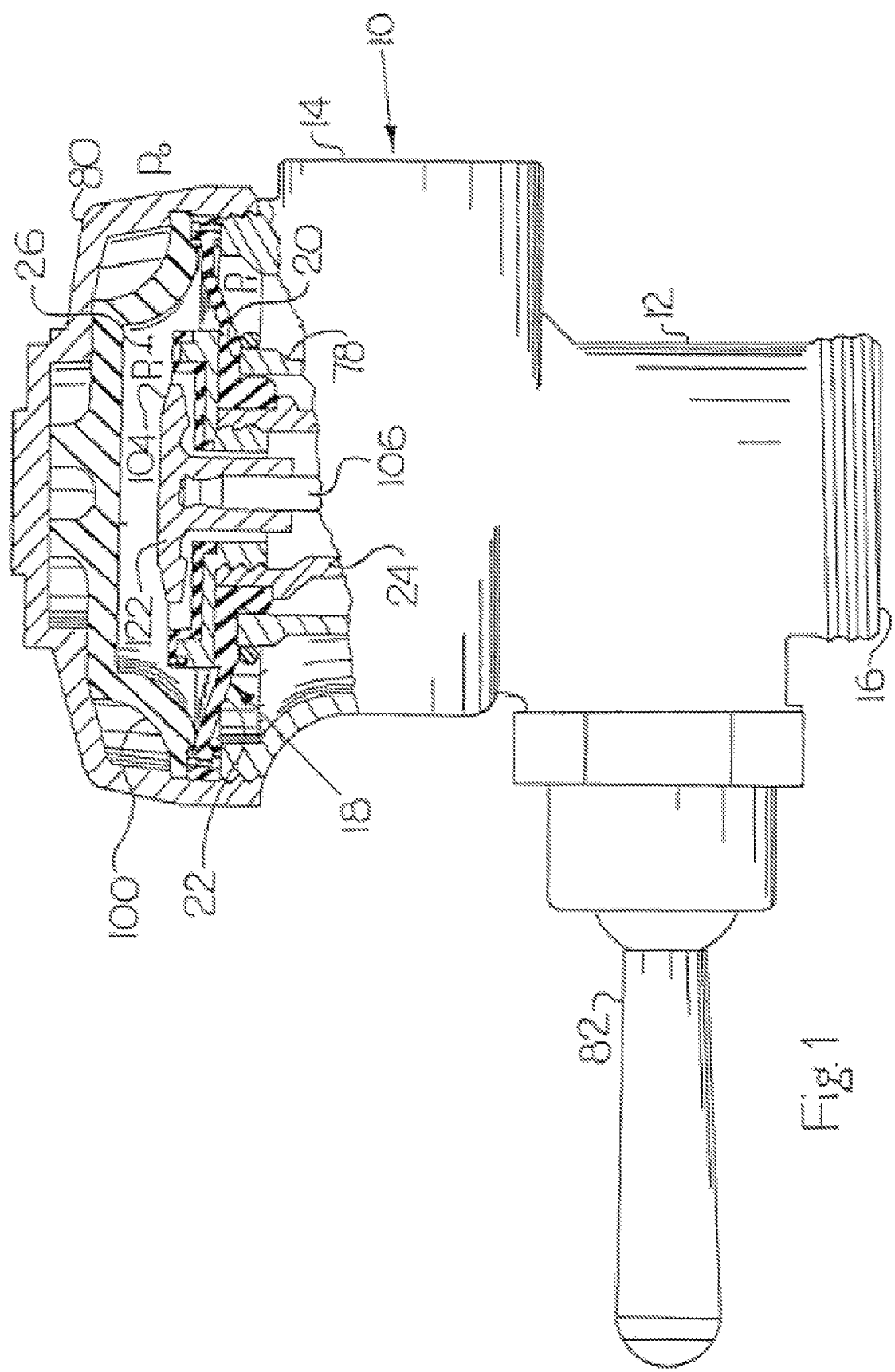
FIG. 1 is a partial, sectional, elevational view of a flush valve assembly in a closed position made in accordance with the present invention.

In the following description and accompanying drawings, like reference numbers, as used in the various Figures, refer to like features or elements. The terms "upper surface" and "underside," as used herein, refer to the orientation of a given element as shown in the drawings.

The present invention is generally directed to a unitary filter diaphragm for use in a flush valve. As shown in FIG. 1, a flush valve 10 includes a valve body 12 having an inlet opening 14 and an outlet opening 16, a valve seat 20 positioned between inlet opening 14 and outlet opening 16, and a flush valve diaphragm assembly 18, movable to a closing position on valve seat 20, such that it is able to stop flow between inlet opening 14 and outlet opening 16. Flush valve diaphragm assembly 18 includes a flexible diaphragm 22 peripherally attached to a barrel slide 24. A pressure chamber 26 is defined above flexible diaphragm 22 for holding flush valve diaphragm assembly 18 on valve seat 20.

Figure 2:
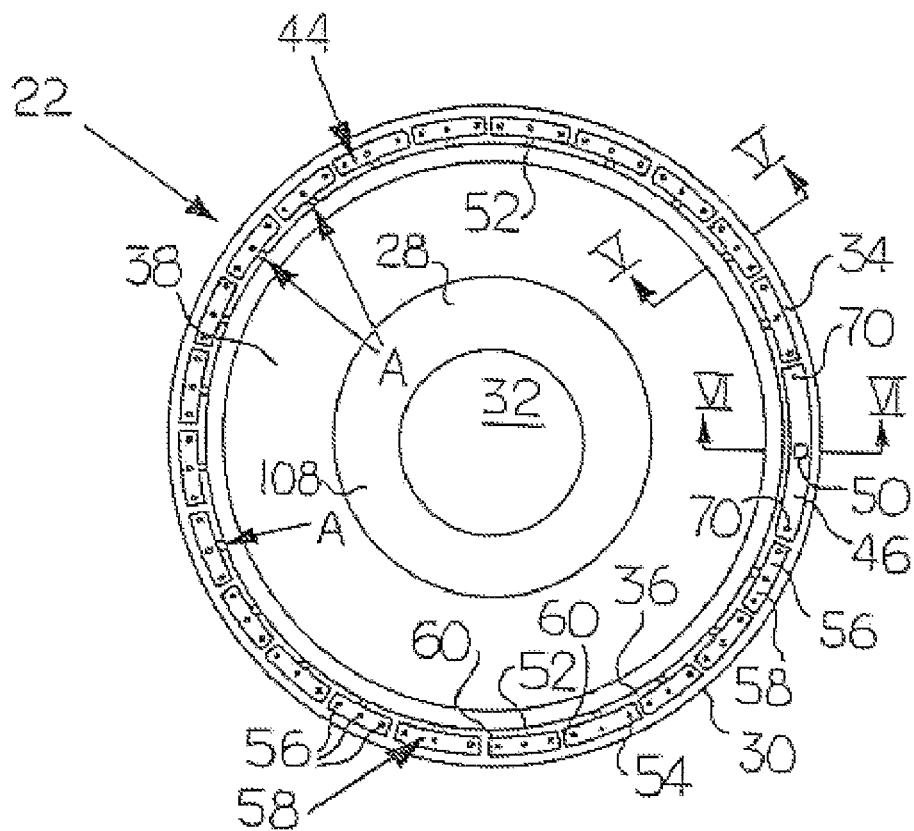
FIG. 2 is a bottom plan view of a flush valve diaphragm made in accordance with the present invention.
Figure 3:
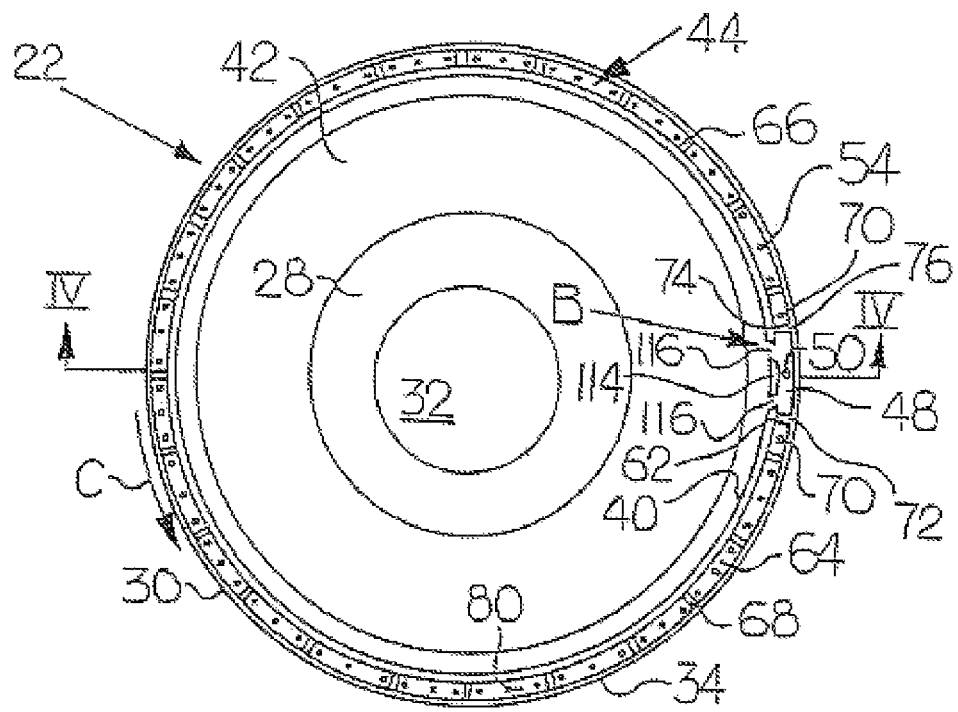
FIG. 3 is a top plan view of the flush valve diaphragm shown in FIG. 2.

Turning to FIGS. 2 and 3, flexible diaphragm 22 includes a body portion 28 and a peripheral sealing portion 30. Body portion 28 has a central passageway 32. Peripheral sealing portion 30 includes a sealing ring 34 with a thickness greater than body portion 28 extending along the periphery of flexible diaphragm 22. Flexible diaphragm 22 also includes a first integral ring 36 on a first side 38 of flexible diaphragm 22 radially spaced from sealing ring 34. A second integral ring 40 on a second side 42 of flexible diaphragm 22 is radially spaced from sealing ring 34. An integral filter 44 is located between sealing ring 34 and first integral ring 36 and between sealing ring 34 and second integral ring 40. A bypass chamber 46 is positioned between first integral ring 36 and sealing ring 34. An exit chamber 48 is positioned between second integral ring 40 and sealing ring 34. At least one bypass orifice 50 extends from and allows fluid communication between bypass chamber 46 and exit chamber 48. Bypass orifice 50 connects inlet opening 14 and pressure chamber 26. Integral filter 44 includes a plurality of circumferentially spaced filter orifices 54 defined in flexible diaphragm 22. Filter orifices 54 extend from first side 38 of diaphragm 22, through diaphragm 22, to second side 42 of diaphragm 22. First side 38 of flexible diaphragm 22 includes first integral ring 36 which includes a plurality of circumferentially spaced support grooves 52. Support grooves 52 are in fluid communication with inlet opening 14. Each support groove 52 is only in fluid communication with a specific set 56 of filter orifices 54. Each respective support groove 52 and respective set 56 of filter orifices 54 are in fluid communication with a respective chamber 58, with the chambers 58 being separated from each other. A plurality of radially extending chamber walls 60, which are circumferentially spaced apart extend from first integral ring 40 to sealing ring 34. Chambers 58 are defined by two adjacent chamber walls 60, portions of sealing ring 34, and first integral ring 36, and include a support groove 52 and a set 56 of filter orifices 54.

The support grooves 52 do not provide any filtering function for the bypass orifice 50 or for filter orifices 54 and are substantially larger than filter orifices 54 and bypass orifice 50. The structure defining support grooves 52 provides support for flexible diaphragm 22. Filter orifices 54 are in fluid communication with a circumferential passageway 64 defined on second side 42 of flexible diaphragm 22. Circumferential passageway 64 includes a first dam wall 62 at a first end 72, a second dam wall 74 at a second end 76, and a plurality of circumferential supports 66 having flow through passages 68, which do not provide a filtering function. At least one flow path orifice 70 is defined in circumferential passageway 64 to direct filtered water to bypass chamber 46 defined on first side 38 of flexible diaphragm 22.

In an embodiment of the invention, there are two flow path orifices 70, one adjacent to first dam wall 62 and one adjacent to second dam wall 74. The filtered water then passes through bypass orifice 74, which has a flow area greater than filter orifices 54, but less than support grooves 52, and filtered water is then directed to the high-pressure side (second side 42) of flexible diaphragm 22. Outer peripheral sealing ring 34 is defined on flexible diaphragm 22 and is radially spaced or offset from support grooves 52 and filter orifices 54. Support grooves 52 and chambers 58 are not in fluid communication with each other, in normal operation of flush valve 10, when liquid flows from support grooves 52 to bypass orifices 70.

Returning to FIG. 1, it shows a flush valve assembly 10 made in accordance with the present invention. The flush valve assembly 10 includes flush valve body 12 having inlet opening 14, outlet opening 16, and barrel 78. A top cap 80 is provided and threadably secured to valve body 12. A handle 82 is provided in valve body 12 to activate flush valve diaphragm assembly 18. Handle 82 operates in the same manner as prior art flush valve mechanisms, as is shown in the Saadi patent.

Figure 8:
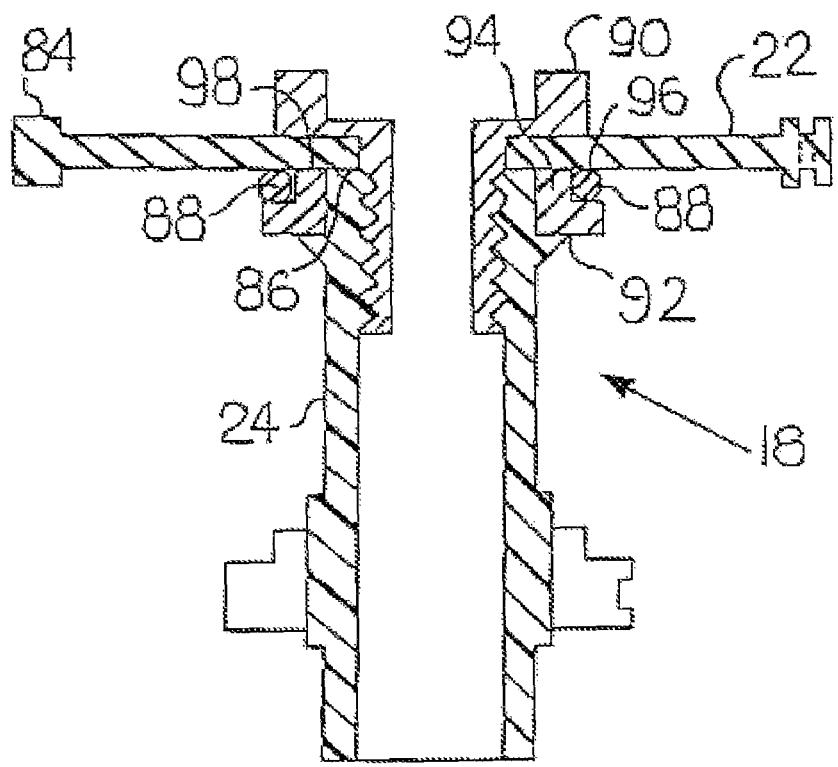
FIG. 8 is a sectional elevation view of a flush valve diaphragm assembly made in accordance with the present invention.

Turning to FIG. 8, flush valve diaphragm assembly 18 includes flexible diaphragm 22. Flexible diaphragm 22 includes a radially outward mounting portion 84 and a radially inward seating surface 86. An optional integral flow ring 88 may be provided. The flow ring 88 is similar to that disclosed in the Verdecchia application. Barrel slide 24 is secured to flexible diaphragm 22 through a locking member 90. Typically, locking member 90 is threadably received by barrel slide 24, thereby sandwiching a portion of diaphragm 22 between lip 92 on barrel slide 24 and locking member 90. Alternatively, an L-shaped receiving washer 94 having an L-shaped cross section may be positioned on lip 92 to receive flow ring 88. Flexible diaphragm 22 is then sandwiched between locking element 90 and a first side 96 of flow ring 88 and first side 98 of L-shaped receiving washer 94. The flush valve diaphragm assembly 18 may also be molded for formed as a single unitary piece.

Referring to FIG. 1, an inner cover 100 is provided and positioned inwardly and adjacent to top cap 80, 102. A relief valve or trip mechanism 104 is provided and positioned adjacent to locking member 90 and barrel slide 24. The relief valve or trip mechanism 104 rests on locking member 90 and is tripped through handle 82 in a manner well known in the art, such as that disclosed in the Saadi patent. Relief valve 104 includes an upper circular sealing disk 122 and an elongated stem 106 attached thereto which coacts with handle 82.

Referring particularly to FIGS. 2-6 and more particularly to FIGS. 2 and 3, flexible diaphragm 22 includes first side 38 and diaphragm second side 42. Diaphragm 22 is made of an elastomeric material, which includes, but is not limited to, natural rubber, synthetic rubber, synthetic polymers, and thermoplastic elastomer resins. Diaphragm 22 includes body portion 28 and peripheral portion 30. Central passageway 32 is defined by the inner perimeter of diaphragm body portion 28. Hence, diaphragm 22 is annular-shaped. Barrel slide 24 passes through central passageway 32. The radially inwardly seating surface 108 is defined on body portion 28.

Peripheral portion 30 of diaphragm 22 includes the circumferential peripheral sealing ring 34 that extends along the outer periphery of diaphragm 22. Sealing ring 34 forms a liquid seal with body 12, top cap 80, and inner cover 100. First integral ring 36 is spaced radially from orifices 54. First integral ring 36 includes the plurality of circumferentially spaced support grooves 52 about the circumference of the diaphragm of which only a portion of the grooves is shown. The plurality of sets 56 of filter orifices 54 are defined in respective chambers 58. Sets 56 and chambers 58 extend about the circumference of the diaphragm 22.

Figure 4:
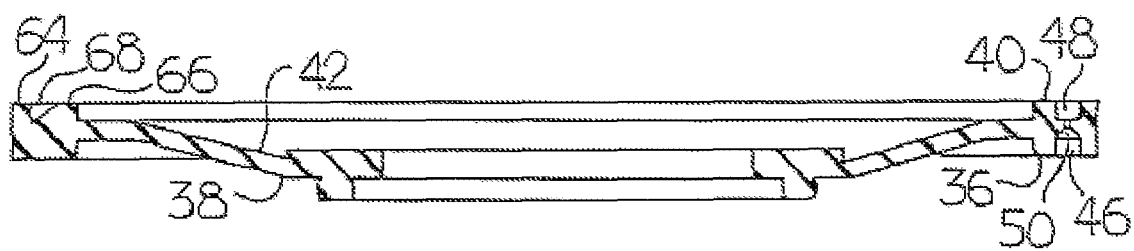
FIG. 4 is a section taken along the lines IV-IV shown in FIG. 3.
Figure 5:
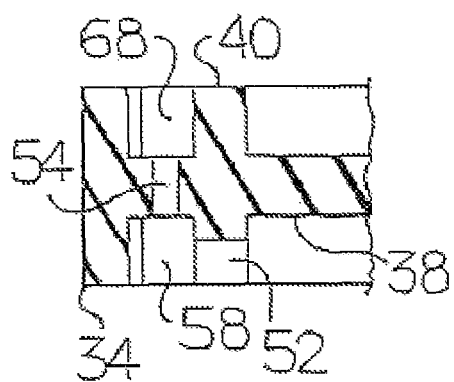
FIG. 5 is an elevational view partially in section of a portion of the diaphragm taken along lines V-V shown in FIG. 2.
Figure 6:
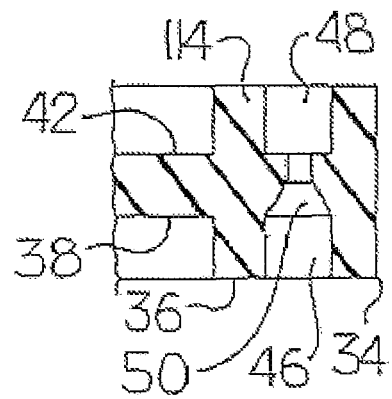
FIG. 6 is an elevational view partially in section of a portion of a flush valve taken along lines VI-VI shown in FIG. 2.

Referring to FIG. 3, second side 42 is in fluid communication with filter orifices 54 through circumferential passageway 64 that is defined on second side 42. The plurality of circumferentially spaced supports 66 extend from the body of flexible diaphragm 22 and are positioned between peripheral seal 30 and second integral ring 40. The plurality of flow through passages 68, as shown in FIG. 4, are defined on supports 66. Circumferential passageway 64 is also in fluid communication with two flow path orifices 70. First dam wall 62 and second dam wall 74 are provided at opposite ends of circumferential passageway 64. Flow path orifices 70 are in fluid communication with bypass chamber 46 defined on first side 38 of flexible diaphragm 22 (see FIGS. 2, 4, and 6).

As shown in FIG. 3, exit chamber 48 is defined by first dam wall 62, second dam wall 74, a diverter shield 114, and includes at least one exit passage 116, and bypass orifice 50. Exit passages 116 are defined by the space between the first 62 and second 74 dam walls and the diverter shield 114. Bypass orifice 50 is defined within exit chamber 48 and diaphragm 22 and is in fluid communication with bypass chamber 46 defined on first side 38 of flexible diaphragm 22. In the present arrangement, unfiltered water from inlet opening 14 passes through support grooves 52 (as shown by arrows A in FIG. 2), travels a serpentine path 118 (that includes path C shown in FIG. 3), then exits as filtered water through exit chamber 48 into the pressure chamber 26 side (second side 42) of flexible diaphragm 22 via exit passages 116 (FIG. 9) (as shown by arrow B in FIG. 3).

Bypass chamber 46 is defined by a portion of sealing ring 34, a portion of first integral ring 36, a first end support 110, and a second end support 112. End supports 110, 112 extend from sealing ring 34 to first integral ring 36. Bypass chamber 46 includes bypass orifice 50 and at least one flow path orifice 70.

More particularly, the present invention is a filter diaphragm 22 for use in a flush valve 10 that includes a valve body 12 having an inlet opening 14 and an outlet opening 16. A valve seat 20 is positioned between inlet opening 14 and outlet opening 16, and a flush valve diaphragm assembly 18, i.e., the diaphragm 22, is movable to a closing position on valve seat 20 to stop flow between inlet opening 14 and outlet opening 16. The flush valve diaphragm assembly 18 includes diaphragm 22 peripherally attached to body 12. Pressure chamber 26 is defined above diaphragm 22 and acts to hold flush valve diaphragm assembly 18 on valve seat 20. Diaphragm 22 includes integral filter 44 and bypass orifice 50, which connects inlet opening 14 and pressure chamber 26. Integral filter 44 includes a plurality of circumferentially spaced filter orifices 54 defined on diaphragm 22. First side 38 of diaphragm 22 includes a first integral ring 36 that includes a plurality of circumferentially spaced support grooves 52. The support grooves 52 are in fluid communication with inlet opening 14. Each support groove 52 is only in communication with a specific set 56 of filter orifices 54. Each respective support groove 52 and set 56 of filter orifices 54 are in fluid communication with a respective chamber 58. The chambers 58 are separated from each other. Support grooves 52 do not provide any filtering function for bypass orifice 50 or filter orifices 54 and are substantially larger than the filter orifices 54. In an embodiment of the present invention, the size of the support grooves 52 is approximately 0.060" wide×0.070" high.

First integral ring 36, defining support grooves 52, provides support for diaphragm 22. The filter orifices 54 are in fluid communication with the circumferential passageway 64 defined on the second side 42 of diaphragm 22. Water passing through filter orifices 54 becomes filtered. The circumferential passageway 64 has a plurality of circumferential supports 66 having flow through passages 68 which provide no filtering function and have a right triangular flow dimension of about 0.070" high at the perpendicular leg and 0.085" wide at the base (FIG. 4). The circumferential supports 66 can alternatively have a U-shaped cross section. Two flow path orifices 70 are defined in circumferential passageway 64 to direct filtered water to bypass chamber 48 defined on first side 38 of diaphragm 22. The filtered water then passes through bypass orifice 50, which has a flow area greater than the filter orifices 54, but less than the support grooves 52 and flow through passages 68. Filtered water is then directed to the high-pressure side (second side 42) of diaphragm 22 adjacent pressure chamber 26. By filtering, it is meant is that filter orifices 54 remove from the water particulates and debris that are larger than the diameter of filter orifices 54, so as to prevent clogging of bypass orifice 74, which has a larger diameter than filter orifices 54. Although the bypass orifice 50 is shown to be integrally formed in the diaphragm 22, a separate insert having bypass orifices 50 can be provided and secured in the diaphragm 22.

In a presently preferred embodiment, the diameter of bypass orifice 74 is 0.020" and the diameter of filter orifices 54 is 0.014". The other flow paths have flow diameters greater than 0.020". Outer peripheral sealing ring 34 is defined on diaphragm 22 and is radially spaced or offset from support grooves 52 and filter orifices 54. Support grooves 52 and chambers 58 are not in fluid communication with each other during normal operation of flush valve 10, when water flows from support grooves 52 to bypass orifice 50.

Figure 9:
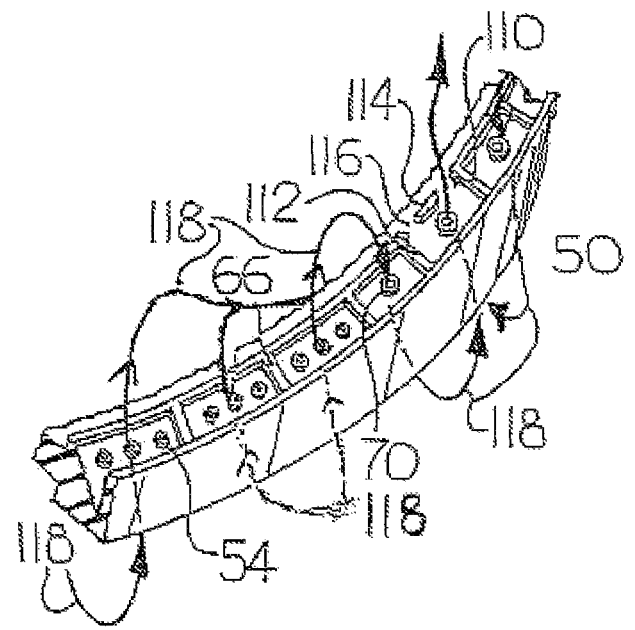
FIG. 9 is a partial perspective view of a flush valve diaphragm made in accordance with the present invention.
Figure 7:
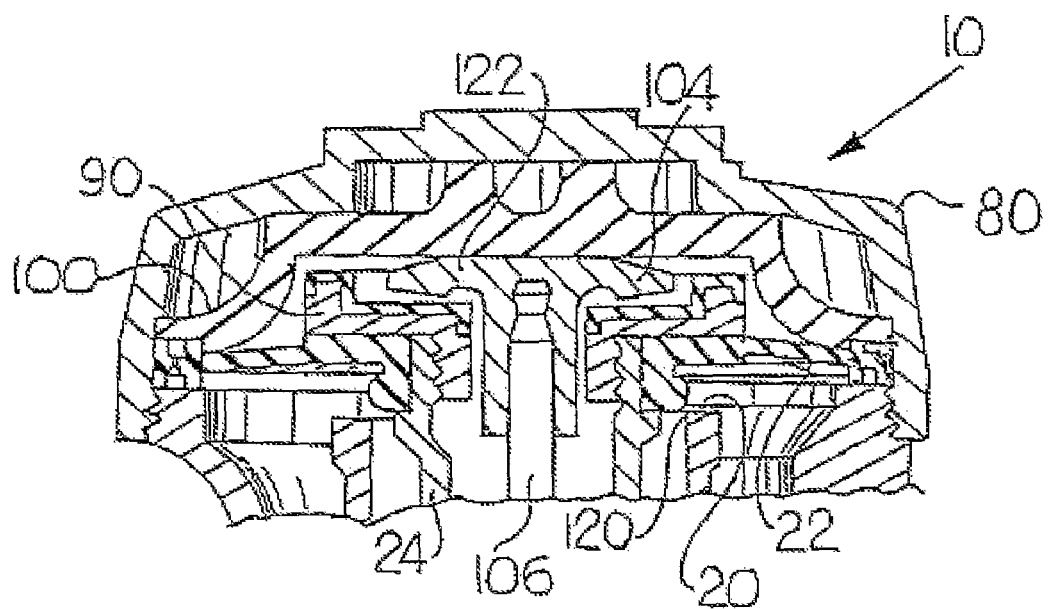
FIG. 7 is a sectional elevational view of a portion of a flush valve assembly shown in FIG. 1 in an opened position.

The operation of flush valve 10 is generally described as follows. In a normally closed position, as is shown in FIG. 1, water pressure $P_1$, which is greater than atmospheric pressure $P_0$, is communicated to pressure chamber 26 at inlet opening 14 through bypass orifice 50. Since the surfaces which are subjected to the water pressure $P_1$ are greater on second side 42 of diaphragm 22, the water pressure forces diaphragm 22 down onto valve seat 20, preventing water from flowing through outlet opening 16. Referring to FIG. 7, when a user moves handle 82 in any direction, a plunger (not shown) moves inwardly, tilting elongated stem 106 of relief valve 104. This action creates an opening 120 between diaphragm 22 and valve seat 20 releasing the pressure in pressure chamber 26 by allowing water to flow through barrel 78 as shown in FIG. 7. With the pressure in pressure chamber 26 relieved, the water inlet pressure forces diaphragm 22 to move upwardly, off of valve seat 20, allowing water to flow directly from the inlet opening 14, through opening 120, barrel 78, and outlet opening 16. When diaphragm 22 and relief valve 104 move upwardly, the relief valve resets itself, closing off the upper chamber. Water will then flow through the circumferentially spaced support grooves 52 and through the respective set 56 of filter orifices 54. The water will then flow through the circumferential passageway 64 and respective flow through passages 68 to the respective flow path orifices 70 via path 118 (FIG. 9). The filtered water will flow downward to first side 38 of diaphragm 22 into bypass chamber 46 and through bypass orifice 50. The filtered water then flows into exit chamber 48 and exit passages 116 into pressure chamber 26 until the diaphragm 22 is again forced against valve seat 20, thereby closing flush valve 10. During the closing of flush valve 10, barrel slide 24 moves downwardly with diaphragm 22 and the outwardly extended flexible flow ring 88. Flow ring 88 contacts barrel 78, again thereby minimizing water hammer effects and acting as a first seal until the radially inwardly seating surface 98 is sealed against valve seat 20.

The present invention provides superior filtering of water prior to the water flowing through bypass orifice 50, thereby preventing clogging of bypass orifice 50. Further, bypass orifice 50 includes a tapered hole arrangement, as disclosed in FIG. 6 and which is described in detail in U.S. Pat. No. 6,299,128 to Verdecchia, to prevent clogging of the bypass orifice should the diameter of the filtering orifices 54 increase due to wear or tearing of the diaphragm 22 and provide no filtering function, alternatively, a cylindrical hole may be provided. An advantage of the present invention is that it provides a filter in a unitary structure integrally formed in diaphragm 22.

An important aspect of the present invention is the arrangement of the various chambers and passages. Specifically, chambers 58 are defined by a portion of the valve body 12, peripheral seal 30, first side 38 of diaphragm 22, and a portion of first integral ring 36. Flow of water into each chamber 58 is only accomplished through a respective support groove 52, and flow can only exit the chamber via a respective set 56 of filter orifices 54. Passageway 64 is defined by a portion of second side 42 of diaphragm 22, a portion of inner cover 100, a portion of second integral ring 40, which is coaxial with first integral ring 36, supports 66, dam walls 62, 74, and a portion of peripheral seal 30. Flow into the passageway 64 can only occur via filter orifices 54, and flow exiting the passageway 64 may only occur through flow path orifices 70. Bypass chamber 46 is defined by a portion of first side 38 of diaphragm 22, a portion of valve body 12, first end support 110, second end support 112, portions of peripheral seal 30, and integral ring 36. Flow into bypass chamber 46 can only occur via flow path orifices 70, and flow exits bypass chamber 46 via bypass orifice 50. Exit chamber 48 is defined by a portion of peripheral seal 30, a portion of a second side 42 of diaphragm 22, first 62 and second 74 dam walls, inner cover 100, portions of second integral ring 40, and shield 114. Flow into exit chamber 48 occurs via bypass orifice 50 and exits via exit passages 116 into the pressure chamber 26. Fluid seals are formed between the interaction of diaphragm 22 and respective contacting or clamping surfaces of the valve body 12, top cap 80, and inner cover 100.

Another embodiment of the present invention is described as follows. In lieu of providing the filter orifices 54 defined in the diaphragm 22, the filtering could take place via the plurality of the support grooves 52. In this arrangement, support grooves 52 would have an effective flow diameter less than bypass orifice 50. Further, supports 66 would be eliminated so that all of chambers 58 are in fluid communication on first side 38 of diaphragm 22. Circumferentially spaced orifices 54 and flow path orifices 70 would be eliminated so that the filtered water would flow directly to bypass orifice 50. This arrangement would also utilize a unitary diaphragm filter arrangement as opposed to a two-piece arrangement.

The present invention has been described with reference to specific details of particular embodiments thereof. It is not intended that such details be regarded as limitations upon the scope of the invention except insofar as and to the extent that they are included in the accompanying claims.

I claim:

1. A flush valve diaphragm comprising a body portion and a peripheral sealing portion, the body portion being flexible and having a central passageway, the peripheral sealing portion comprising an integral filter integrally molded in the flush valve diaphragm and made of the same elastomeric material as the flush valve diaphragm, wherein water is filtered via the integral filter while passing through the sealing portion of the flush valve diaphragm and before passing through a bypass orifice formed in the flush valve diaphragm.

2. The flush valve diaphragm of claim 1, wherein the peripheral sealing portion further comprises a sealing ring with a thickness greater than the body portion extending along the periphery of the flush valve diaphragm; a first integral ring on a first side of the flush valve diaphragm radially spaced from the sealing ring; a second integral ring on a second side of the flush valve diaphragm radially spaced from the sealing ring, wherein the integral filter is located between the sealing ring and the first integral ring and between the sealing ring and the second integral ring.

3. The flush valve diaphragm of claim 2, wherein the peripheral sealing portion further comprises a bypass chamber positioned between the first integral ring and the sealing ring, an exit chamber positioned between the second integral ring and the sealing ring; and the bypass orifice extending from and allowing fluid communication between the bypass chamber and the exit chamber.

4. The flush valve diaphragm of claim 3, wherein the integral filter comprises a plurality of filter orifices extending from the first side of the diaphragm, through the diaphragm to the second side of the diaphragm.

5. The flush valve diaphragm of claim 4, wherein each of the filter orifices have a filter orifice diameter, and the bypass orifice has a bypass orifice diameter, where each of the filter orifice diameters is smaller than the bypass orifice diameter.

6. The flush valve diaphragm of claim 1, wherein the diaphragm body is made of a material selected from the group consisting of natural rubber, synthetic rubber, synthetic polymer, and thermoplastic elastomer resin.

7. The flush valve diaphragm of claim 1, wherein the peripheral sealing portion defines an outer periphery of the flush valve diaphragm and the integral filter is molded in the flush valve diaphragm adjacent to the outer periphery of the flush valve diaphragm.

8. The flush valve diaphragm of claim 7, wherein the peripheral sealing portion further comprises a sealing ring with a thickness greater than the body portion extending along the outer periphery of the flush valve diaphragm; a first integral ring on a first side of the flush valve diaphragm radially spaced from the sealing ring; a second integral ring on a second side of the flush valve diaphragm radially spaced from the sealing ring, wherein the first side of the flush valve diaphragm is opposite to the second side of the flush valve diaphragm, the first integral ring and the second integral ring are equally radially spaced from the sealing ring, and the integral filter is located adjacent to and between the sealing ring and the first integral ring and adjacent to and between the sealing ring and the second integral ring.

9. A flush valve diaphragm assembly for use in a flush valve, comprising:
   a) a flush valve diaphragm comprising a body portion and a peripheral sealing portion, the body portion being flexible and having a central passageway, the peripheral sealing portion comprising an integral filter integrally molded with the flush valve diaphragm and made of the same elastomeric material as the flush valve diaphragm, wherein water is filtered via the integral filter while passing through the sealing portion of the flush valve diaphragm and before passing through a bypass orifice formed in the flush valve diaphragm; and
   b) a barrel slide, which is partially passed through the central passageway to which the diaphragm is secured.

10. The flush valve diaphragm assembly of claim 9, wherein the barrel slide is secured to the diaphragm through a locking member.

11. The flush valve diaphragm assembly of claim 10, wherein the locking member is threadably received by the barrel slide sandwiching a portion of the diaphragm between a support lip on the barrel slide and the locking element.

12. The flush valve diaphragm assembly of claim 11, comprising an integral flow ring located between the diaphragm and the support lip on the barrel slide.

13. The flush valve diaphragm assembly of claim 9, wherein the peripheral sealing portion defines an outer periphery of the flush valve diaphragm and the integral filter is molded in the flush valve diaphragm adjacent to the outer periphery of the flush valve diaphragm.

14. The flush valve diaphragm assembly of claim 13, wherein the peripheral sealing portion further comprises a sealing ring with a thickness greater than the body portion extending along the outer periphery of the flush valve diaphragm; a first integral ring on a first side of the flush valve diaphragm radially spaced from the sealing ring; a second integral ring on a second side of the flush valve diaphragm radially spaced from the sealing ring, wherein the first side of the flush valve diaphragm is opposite to the second side of the flush valve diaphragm, the first integral ring and the second integral ring are equally radially spaced from the sealing ring, and the integral filter is located adjacent to and between the sealing ring and the first integral ring and adjacent to and between the sealing ring and the second integral ring.

15. A flush valve, comprising:
a) a valve body defining an inlet opening and an outlet opening;
b) a valve seat positioned between the inlet and the outlet of the flush valve;
c) a flush valve diaphragm assembly movable to a closing position on the valve seat to stop flow between the inlet and the outlet; and
d) a diaphragm assembly positioned in the valve body and separating the inlet and the outlet, with the diaphragm assembly configured to have a pressure difference applied across the diaphragm assembly and said diaphragm assembly comprising:
   i) a flush valve diaphragm comprising a body portion and a peripheral sealing portion, the body portion being flexible and having a central passageway, the peripheral sealing portion comprising an integral filter integrally molded with the flush valve diaphragm and made of the same elastomeric material as the flush valve diaphragm; and
   ii) a barrel slide, which is partially passed through the central passageway to which the diaphragm is secured, whereby water enters through the inlet opening, flows through the sealing portion of the flush valve diaphragm by passing through the integral filter before passing through a bypass orifice formed in the flush valve diaphragm.

16. The flush valve of claim 15, wherein the peripheral sealing portion defines an outer periphery of the flush valve diaphragm and the integral filter is molded in the flush valve diaphragm adjacent to the outer periphery of the flush valve diaphragm.

17. The flush valve of claim 16, wherein the peripheral sealing portion further comprises a sealing ring with a thickness greater than the body portion extending along the outer periphery of the flush valve diaphragm; a first integral ring on a first side of the flush valve diaphragm radially spaced from the sealing ring; a second integral ring on a second side of the flush valve diaphragm radially spaced from the sealing ring, wherein the first side of the flush valve diaphragm is opposite to the second side of the flush valve diaphragm, the first integral ring and the second integral ring are equally radially spaced from the sealing ring, and the integral filter is located adjacent to and between the sealing ring and the first integral ring and adjacent to and between the sealing ring and the second integral ring.

18. A flush valve diaphragm comprising a body portion and a peripheral sealing portion, the body portion being flexible and having a central passageway, the peripheral sealing portion comprising an integral filter integrally molded in the flush valve diaphragm and made of the same elastomeric material as the flush valve diaphragm, wherein water is filtered via the integral filter while passing through the sealing portion of the flush valve diaphragm, and
wherein the peripheral sealing portion further comprises a sealing ring with a thickness greater than the body portion extending along the periphery of the flush valve diaphragm; a first integral ring on a first side of the flush valve diaphragm radially spaced from the sealing ring; a second integral ring on a second side of the flush valve diaphragm radially spaced from the sealing ring, wherein the integral filter is located between the sealing ring and the first integral ring and between the sealing ring and the second integral ring.

19. The flush valve diaphragm of claim 18, wherein the peripheral sealing portion further comprises a bypass chamber positioned between the first integral ring and the sealing ring, an exit chamber positioned between the second integral ring and the sealing ring; and a bypass orifice extending from and allowing fluid communication between the bypass chamber and the exit chamber.

20. The flush valve diaphragm of claim 19, wherein the integral filter comprises a plurality of filter orifices extending from the first side of the diaphragm, through the diaphragm to the second side of the diaphragm.

21. The flush valve diaphragm of claim 20, wherein each of the filter orifices have a filter orifice diameter, and the bypass orifice has a bypass orifice diameter, where each of the filter orifice diameters is smaller than the bypass orifice diameter.

22. The flush valve diaphragm of claim 18, wherein the diaphragm body is made of a material selected from the group consisting of natural rubber, synthetic rubber, synthetic polymer, and thermoplastic elastomer resin.

23. A flush valve diaphragm comprising a body portion and a peripheral sealing portion, the body portion being flexible and having a central passageway, the peripheral sealing portion comprising an integral filter integrally molded in the flush valve diaphragm and made of the same elastomeric material as the flush valve diaphragm, wherein water is filtered via the integral filter while passing through the sealing portion of the flush valve diaphragm,
wherein the peripheral sealing portion defines an outer periphery of the flush valve diaphragm and the integral filter is molded in the flush valve diaphragm adjacent to the outer periphery of the flush valve diaphragm, and
wherein the peripheral sealing portion further comprises a sealing ring with a thickness greater than the body portion extending along the outer periphery of the flush valve diaphragm; a first integral ring on a first side of the flush valve diaphragm radially spaced from the sealing ring; a second integral ring on a second side of the flush valve diaphragm radially spaced from the sealing ring, wherein the first side of the flush valve diaphragm is opposite to the second side of the flush valve diaphragm, the first integral ring and the second integral ring are equally radially spaced from the sealing ring, and the integral filter is located adjacent to and between the sealing ring and the first integral ring and adjacent to and between the sealing ring and the second integral ring.

24. A flush valve diaphragm assembly for use in a flush valve, comprising:
a) a flush valve diaphragm comprising a body portion and a peripheral sealing portion, the body portion being flexible and having a central passageway, the peripheral sealing portion comprising an integral filter integrally molded with the flush valve diaphragm and made of the same elastomeric material as the flush valve diaphragm, wherein water is filtered via the integral filter while passing through the sealing portion of the flush valve diaphragm; and b) a barrel slide, which is partially passed through the central passageway to which the diaphragm is secured, wherein the peripheral sealing portion defines an outer periphery of the flush valve diaphragm and the integral filter is molded in the flush valve diaphragm adjacent to the outer periphery of the flush valve diaphragm, and wherein the peripheral sealing portion further comprises a sealing ring with a thickness greater than the body portion extending along the outer periphery of the flush valve diaphragm; a first integral ring on a first side of the flush valve diaphragm radially spaced from the sealing ring; a second integral ring on a second side of the flush valve diaphragm radially spaced from the sealing ring, wherein the first side of the flush valve diaphragm is opposite to the second side of the flush valve diaphragm, the first integral ring and the second integral ring are equally radially spaced from the sealing ring, and the integral filter is located adjacent to and between the sealing ring and the first integral ring and adjacent to and between the sealing ring and the second integral ring.

25. A flush valve, comprising:
a) a valve body defining an inlet opening and an outlet opening;
b) a valve seat positioned between the inlet and the outlet of the flush valve;
c) a flush valve diaphragm assembly movable to a closing position on the valve seat to stop flow between the inlet and the outlet; and
d) a diaphragm assembly positioned in the valve body and separating the inlet and the outlet, with the diaphragm assembly configured to have a pressure difference applied across the diaphragm assembly and said diaphragm assembly comprising:
  i) a flush valve diaphragm comprising a body portion and a peripheral sealing portion, the body portion being flexible and having a central passageway, the peripheral sealing portion comprising an integral filter integrally molded with the flush valve diaphragm and made of the same elastomeric material as the flush valve diaphragm; and
  ii) a barrel slide, which is partially passed through the central passageway to which the diaphragm is secured, whereby water enters through the inlet opening, flows through the sealing portion of the flush valve diaphragm by passing through the integral filter, wherein the peripheral sealing portion defines an outer periphery of the flush valve diaphragm and the integral filter is molded in the flush valve diaphragm adjacent to the outer periphery of the flush valve diaphragm, and wherein the peripheral sealing portion further comprises a sealing ring with a thickness greater than the body portion extending along the outer periphery of the flush valve diaphragm; a first integral ring on a first side of the flush valve diaphragm radially spaced from the sealing ring; a second integral ring on a second side of the flush valve diaphragm radially spaced from the sealing ring, wherein the first side of the flush valve diaphragm is opposite to the second side of the flush valve diaphragm, the first integral ring and the second integral ring are equally radially spaced from the sealing ring, and the integral filter is located adjacent to and between the sealing ring and the first integral ring and adjacent to and between the sealing ring and the second integral ring.

* * * * *